United States Patent
Verzwyvelt et al.

(10) Patent No.: US 11,260,599 B2
(45) Date of Patent: Mar. 1, 2022

(54) MODULATING A THREE-DIMENSIONAL PRINTER SYSTEM BASED ON A SELECTED MODE

(71) Applicant: HEWLETT-PACKARD DEVELOPMENT COMPANY, L.P., Houston, TX (US)

(72) Inventors: Vanessa Verzwyvelt, Houston, TX (US); Matthew A. Shepherd, Houston, TX (US); Arthur H. Barnes, Houston, TX (US); Wesley R. Schalk, Houston, TX (US); Hector Jose Lebron, Houston, TX (US); Jake Wright, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 783 days.

(21) Appl. No.: 16/077,054

(22) PCT Filed: Jul. 28, 2017

(86) PCT No.: PCT/US2017/044456
§ 371 (c)(1),
(2) Date: Aug. 10, 2018

(87) PCT Pub. No.: WO2019/022775
PCT Pub. Date: Jan. 31, 2019

(65) Prior Publication Data
US 2021/0178695 A1    Jun. 17, 2021

(51) Int. Cl.
*B29C 64/393*    (2017.01)
*B33Y 30/00*    (2015.01)
(Continued)

(52) U.S. Cl.
CPC .......... *B29C 64/393* (2017.08); *B29C 64/205* (2017.08); *B29C 64/295* (2017.08); *B33Y 30/00* (2014.12); *B33Y 50/02* (2014.12)

(58) Field of Classification Search
CPC ..... B29C 64/393; B29C 64/205; B33Y 30/00; B33Y 50/02; B33Y 10/00
(Continued)

(56) References Cited

U.S. PATENT DOCUMENTS 6,583,381 B1 *   6/2003   Duignan ............ B23K 15/0006
                                                      219/121.69
9,342,768 B2     5/2016   Nakano et al.
(Continued)

FOREIGN PATENT DOCUMENTS

CN    103747943    4/2014
CN    104608383    5/2015
(Continued)

OTHER PUBLICATIONS

Langnau, "Here they come—faster additive manufacturing systems", Injection Molding Material Selector, Retrieved from Internet: http://www.makepartsfast.com/here-they-come-faster-additive-manufacturing-systems/, 2015, 6 pages.

*Primary Examiner* — Michael J Brown
(74) *Attorney, Agent, or Firm* — HP Inc. Patent Department

(57) ABSTRACT

A control system for a three-dimensional printer includes an energy component interface, an agent depositing component interface, and control logic. The control logic controls the operation of an energy component through the energy component interface and an agent depositing component through the agent depositing component, in forming an output object that is specified in a print job. Additionally, in some examples, the control logic can implement a plurality of modes. Each mode, when selected modulate one or more (Continued)

operational parameters of a least one of the energy component or agent depositing component.

20 Claims, 3 Drawing Sheets

(51) Int. Cl.
  *B29C 64/295* (2017.01)
  *B33Y 50/02* (2015.01)
  *B29C 64/205* (2017.01)
(58) Field of Classification Search
  USPC .......................................................... 700/98
  See application file for complete search history.

(56) References Cited

U.S. PATENT DOCUMENTS

| 2010/0191360 | A1* | 7/2010 | Napadensky | ........... B29C 64/40 |
| | | | | 700/98 |
| 2014/0288699 | A1 | 9/2014 | Williams et al. | |
| 2015/0035186 | A1 | 2/2015 | Teken et al. | |
| 2015/0314528 | A1 | 11/2015 | Gordon | |
| 2015/0375451 | A1 | 12/2015 | Voris et al. | |
| 2016/0059482 | A1 | 3/2016 | Hakkaku | |
| 2018/0063661 | A1* | 3/2018 | Hartwell | .................. H04R 3/00 |

FOREIGN PATENT DOCUMENTS

| CN | 105109046 | | 12/2015 |
| CN | 105916663 | | 8/2016 |
| CN | 105939836 | | 9/2016 |
| CN | 106313503 | A | 1/2017 |
| EP | 2664444 | | 11/2013 |
| EP | 3147105 | | 3/2017 |
| JP | 2016047603 | | 4/2016 |
| JP | 2017512144 | | 5/2017 |
| KR | 20160098429 | | 8/2016 |
| RU | 164639 | U1 | 9/2016 |
| WO | WO-2009013751 | | 1/2009 |
| WO | 2013113372 | A1 | 8/2013 |
| WO | WO-2014022134 | | 2/2014 |
| WO | WO-2015106844 | | 7/2015 |

* cited by examiner

MODULATING A THREE-DIMENSIONAL PRINTER SYSTEM BASED ON A SELECTED MODE

BACKGROUND

Three-dimensional printer systems are used to create three-dimensional objects as output. Typically, the operation of a three-dimensional printer system can be based on a variety of factors, such as the type of the build material used, the desired quality of the output, or the characteristics of the printer system itself.

BRIEF DESCRIPTION OF THE DRAWINGS

The disclosure herein is illustrated by way of example, and not by way of limitation, in the figures of the accompanying drawings in which like reference numerals refer to similar elements, and in which.

Figure 1:
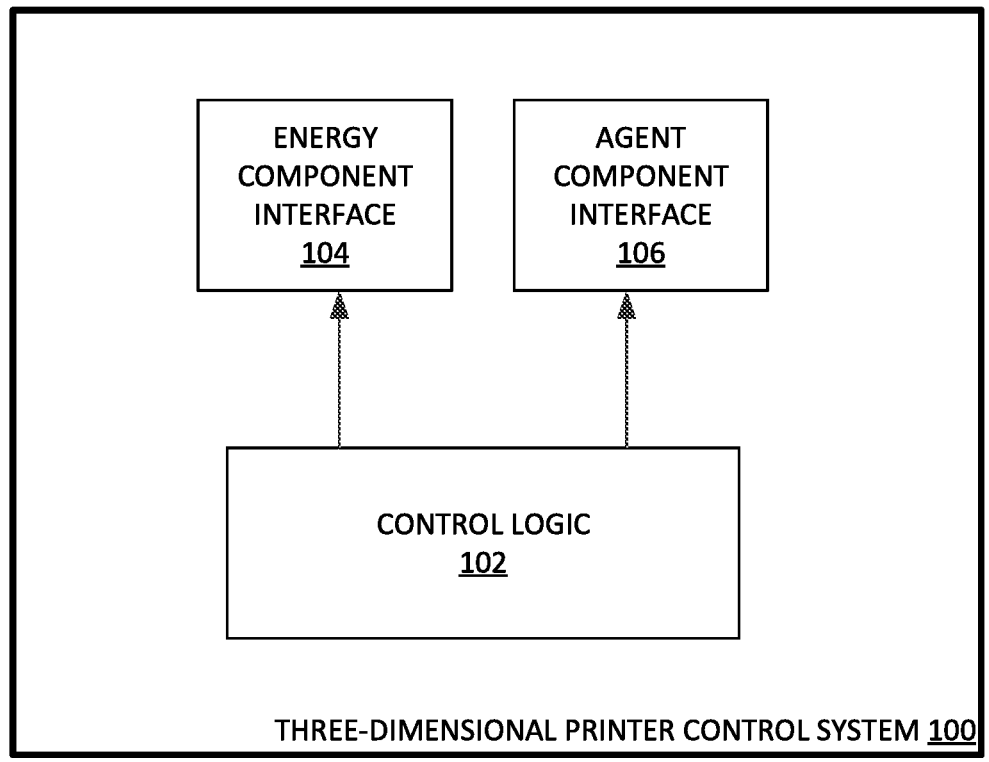
FIG. 1 illustrates an example control system for a three-dimensional printer.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

Examples provide for a three-dimensional printer system that can modulate its operation in accordance with a selected mode. In some examples, based on a selected mode of operation, the three-dimensional printer system can modulate a set of operational parameters, relating to how internal components of the three-dimensional printer system operate. The three-dimensional printer system can also alter a physical property of an output specified by a print job, in accordance with a selected mode of operation.

Still further, in some examples, examples include a control system for a three-dimensional printer that enables a user to select a mode from multiple available predetermined modes. Each of the multiple predetermined modes can define an acceptable range of tolerances with respect to physical properties, such as color properties and mechanical properties, of a three-dimensional output.

System Description

FIG. 1 illustrates an example three-dimensional printer control system that can modulate an operational parameter of a three-dimensional printer system. As illustrated in FIG. 1, three-dimensional printer control system 100 can include control logic 102, energy component interface 104, and agent depositing component interface 106. Control logic 102 can implement processes to manage operations of a three-dimensional printer system to generate an output. For example, control logic 102 can control the operation of an energy component through energy component interface 104 and an agent depositing component through agent depositing component interface 106 to generate an output. In some examples, three-dimensional printer control system 100 can include a material depositing component interface. In such examples, control logic 102 can control the operation of a material depositing component through the material depositing component interface. In other examples, control logic 102 determines a set of operational parameters to be utilized when controlling the operation of the energy component, the material depositing component and/or the agent depositing component, in the course of executing a print job to generate an output. In yet other examples, control logic 102 can implement multiple modes of operation in which each mode can define a set of tolerances for an output of a three-dimensional printer system. The tolerances may relate to, for example, dimensional tolerances, tolerances of strength or material properties, and tolerances of aesthetics (e.g., vibrancy of color). Additionally, each mode may restrict or relax a specific tolerance, as compared to a default value or corresponding tolerance value of another mode. In this way, each mode may cause the control logic 102 to implement a corresponding range of tolerances to map operational parameters of the three-dimensional printer system to a desired set of physical properties of the output.

A selected mode can cause control logic 102 to modulate one or more of the operational parameters of an energy component, an agent depositing component, and/or a material depositing component, through energy component interface 104, agent depositing component interface 108, and/or the material component interface, respectively. An energy component (e.g., halogen tungsten lamps) can deliver energy (e.g., thermal energy) to build material to fuse the build material together to form an output with physical properties specified by a print job. In some examples, the build material can be powder based (e.g., a power based plastic). In other examples, the build material can be combined with fusing agents (e.g., thermal absorbing agents that cause the build material to heat up, melt, and fuse). Examples of operational parameters of an energy component that control logic 102 can control and/or modulate include the amount of energy. Control logic 102 may modulate the energy in accordance with operational parameters that are based on factors that may include: when the energy is delivered; the duration in which the energy component delivers energy to the build materials; the temperature and/or wavelength of the energy delivered; the power output; and the location on the build material and/or agent. In some examples, control logic 102 can implement a selection process to select from a variety of agents (e.g., coloring agents/fusing agents) an agent to be used to form the output. Additionally, in such examples, the print job can include parameters indicating which agent type to select.

A material depositing component can deposit and lay down build material to be fused. Examples of operational parameters of the material depositing component control logic 102 can control and/or modulate include the amount of build material to be deposited. Control logic 102 may modulate the amount of build material to be deposited in accordance with operational parameters that are based on when the build material is deposited, the type of build material deposited (e.g., plastic, metallic, etc.) the rate at which the build material is to be deposited and/or in examples where the three-dimensional printer system includes a build platform, the location on the build platform that the build material is to be deposited.

In some examples, the mode selected can cause control logic 102 to modulate whether the material depositing component deposits fresh build material (e.g., build material that has not been exposed to energy from the energy component), recycled build material (e.g., build material that has been exposed to energy from the energy component during a previous print operation/job, but not enough energy to fully fuse the build material to form the output) or a mixture between fresh and recycled build material. In such examples, three-dimensional printer system 100 can include receptacle(s) to store fresh build material or recycled build material. Additionally, in such examples, control logic 102 can modulate the operational parameters initially determined from the print job to the operational parameters indicated by the mode. For example, even if the print job specifies that the output of three-dimensional printer system 100 utilize fresh build material, a selected mode can trigger control logic 102 to cause the material depositing component to deposit the recycled build material instead. In some implementations, control logic 102 can determine if the recycled build material stored in three-dimensional printer system 100 is appropriate for the current print job (e.g., if the recycled build material has been too fused or altered in the previous print event to be able to be utilized to form an output with physical attributes specified by the next print job). In other implementations, the selected mode can be specific as to whether the usage of the recycled build material is either recycled build material or a mixture of fresh and recycled build material.

An agent depositing component can deposit and lay down various agent that affect, for example, a visual appearance of the output. In some examples, the agent depositing component can deposit fusing agents and/or coloring agents. Examples of operational parameters of the agent depositing component that control logic 102 can control and/or modulate include the amount of agent to be deposited. Control logic 102 may modulate the amount of agent to be deposited in accordance with operational parameters that are based on when the agent is deposited, the type of agent (e.g., coloring agent and/or fusing agent) to be deposited, the rate that the agent is to be deposited, and the location on the build material (fresh, recycled, or a mixture of fresh and recycled) where the agent is to be deposited.

In some examples, the mode selected can cause control logic 102 to modulate operational parameters of an agent depositing component that are related to the mixture of coloring agents and fusing agents. In such examples, the three-dimensional printer system can include receptacle(s) to store fusing agents or various coloring agents. Additionally, in such examples, control logic 102 can modulate the operation parameters initially determined from the print job to the operational parameters indicated by the mode. For example, control logic 102 can determine from an aesthetic property (e.g., a color vibrancy) of the print job, a mixture of coloring agent or combination of coloring agents and fusing agents that the agent depositing component should deposit to achieve said aesthetic property. Additionally, control logic 102 can determine that a selected mode indicates restricting or prioritizing a range of tolerances for a material strength property and relaxing a range of tolerances for the aesthetic property of the output. As such, based on the selected mode, control logic 102 can cause the agent depositing component to deposit a mixture of coloring agent or combination of coloring agents and fusing agents that is within the range of tolerances of the selected mode.

In some implementations, based on a selected mode, control logic 102 can control and/or modulate an ordered layering process (e.g., the three-dimensional printer system forms the output by successively depositing and fusing layers of build material and agents) to form the output. For example, control logic 102 can control the order that the material depositing component and the agent depositing component lay down build material and agents (e.g., coloring agent and/or fusing agent). Additionally, control logic 102 can control the timing and order that the energy component exposes energy to the build material and/or agent.

Still further, the control logic 102 can operate in any one of multiple possible modes. In some examples, each mode can indicate an acceptable range of tolerances with respect to the physical properties of the output specified by the print job that control logic 102 can adhere to when implementing processes of the three-dimensional printer system (e.g., an energy component, a material depositing component and/or an agent depositing component) to form the output. In other examples, each mode can indicate a physical property (e.g., the aesthetics of the output, the strength of the output and the dimensional accuracy of the output object) that control logic 102 can prioritize when implementing processes of the three-dimensional printer system to form the output.

In some examples, some modes can cause control logic 102 to relax the acceptable range of tolerances (e.g., a proof mode) with respect to the physical properties of the output specified by the print job. In such examples, a selected mode indicating a relaxed range of tolerances can cause control logic 102 to determine a set of operational parameters for the three-dimensional printer system (e.g., an energy component, the material depositing component and/or an agent depositing component) to form an output that has physical properties within the relaxed range of tolerances.

Additionally, in some examples, control logic 102 can modulate the operational parameters initially determined for the print job (e.g., to form an output with physical properties specified by the print job) to the operational parameters that would form the output with physical properties within the relaxed range of tolerances. In such examples, the selected mode could result in a faster overall formation of the output of the print job by the three-dimensional printer system. Examples of operational parameters of the internal components of the three-dimensional printer system control logic 102 could modulate to form an output with physical properties within the relaxed range of tolerances include decreasing the amount of energy delivered by the energy component, decreasing the number of times the energy component delivers energy to the build material and/or agent, decreasing the amount of build material deposited by the material depositing component, increasing the rate that build material is deposited by the material depositing component, decreasing the amount of agent deposited by the agent depositing component, and increasing the rate that the agent depositing component deposits the agent.

In some examples, a selected mode indicating a relaxed range of tolerances could result in an output with a physical property (e.g., aesthetics, elongation, tensile strength, impact strength, dimensional accuracy, etc.) that are different from a physical property specified by the print job. For example, the object could be materially weaker than the strength properties specified by the print job, the aesthetics of the output could differ (e.g., a less vibrant coloring) than the aesthetics properties specified by the print job, and/or the dimensions of the output could be less accurate than the dimensional properties specified by the print job.

In other examples, some modes can cause control logic 102 to restrict the acceptable range of tolerances (e.g., a final mode) with respect to the physical properties of the output specified by the print job. In such examples, a selected mode with a restricted range of tolerances can cause control logic 102 to determine a set of operational parameters for a three-dimensional printer system (e.g., an energy component, the material depositing component and/or an agent depositing component) to form an output that has physical properties closely matched to the physical properties specified by the print job.

Additionally, in some examples, control logic 102 can modulate the operational parameters initially determined for the print job (e.g., to form an output with physical properties specified by the print job) to the operational parameters that would form the output with physical properties within the restricted range of tolerances. In such examples, the overall formation of the output of the print job by a three-dimensional printer system could be slower. Examples of operational parameters of the internal components of the three-dimensional printer system, control logic 102 could modulate the operational parameters by increasing the amount of energy delivered by the energy component, increasing the number of times the energy component delivers energy to the build material and/or agent, increasing the amount of build material deposited by the material depositing component, decreasing the rate that the material depositing component deposits the build materials, increasing the amount of agent deposited by the agent depositing component, and decreasing the rate that the agent depositing component deposits the agents.

In some examples, a selected mode indicating a relaxed range of tolerances could result in an output with physical properties (e.g., the physical properties of the output (e.g., aesthetics, elongation, tensile strength, impact strength, dimensional accuracy, etc.) that more closely match the physical properties specified by the print job.

In yet other examples some modes can cause control logic 102 to prioritize a physical property of the output (e.g., aesthetics, elongation, tensile strength, impact strength, dimensional accuracy, etc.). In such examples, control logic 102 can determine a set of operational parameters for the three-dimensional printer system (e.g., an energy component, the material depositing component and/or an agent depositing component) to prioritize the physical property indicated by the selected mode. Additionally, control logic 102 could modulate the operational parameters of the three-dimensional printer system from the operational parameters determined for the print job (e.g., to form an output with physical properties specified by the print job) to the operational parameters that would form the output object with the prioritized a physical property associated with the selected mode. In some examples, a mode can indicate multiple physical properties to prioritize in the formation of the output.

In some examples, a selected mode can prioritize the aesthetics (e.g., color, texture, etc.) of an output of specified by a print job. For example, a selected mode can indicate prioritizing the color property of the output. In response, control logic 102 could determine the operational parameters for the three-dimensional printer system (e.g., an energy component, the material depositing component and/or an agent depositing component) that prioritizes the color property of output (as indicated by the selected mode). In some examples, control logic 102 can modulate the operational parameters determined for the print job (e.g., to form an output with physical properties specified by the print job) to the operational parameters that would prioritize the physical property associated with the selected mode when forming the output. Examples of operational parameters of the three-dimensional printer system control logic 102 could modulate to prioritize color can include, the amount of coloring agent deposited by the agent depositing component, the amount of fusing agent deposited by the agent depositing component, the amount of energy delivered by the energy component to the build material and/or agent (e.g., coloring agent and/or fusing agent) and the order that the material depositing component and the agent depositing component deposit build material and agent.

Control logic 102 can consider the material properties of the build material being utilized by the material depositing component when determining or modulating a set of operational parameters for the three-dimensional printer system (e.g., an energy component, a material depositing component and/or an agent depositing component to form an output of the print job). For example, a build material deposited by the material depositing component can lose some of its aesthetic properties the more fused the build material is. Additionally, a selected mode indicates prioritizing the strength properties (e.g., tensile strength or impact strength) of the output of the print job. Taken together, control logic 102 can modulate the operational parameters of the three-dimensional printer system by taking into consideration the selected mode and the material properties of the build material when forming the output. For example, control logic 102 can relax the acceptable range of tolerances with respect to the coloring properties specified by the print job (e.g., decrease the amount of energy of an appropriate wavelength for the coloring agent that is delivered by the energy component, decrease the number of times the energy component delivers said energy of the appropriate wave length for the coloring agent and decrease the amount of coloring agent deposited by the agent depositing component) and make more restricted the acceptable range of tolerances with respect to the strength properties (e.g., increase the amount of energy of an appropriate wavelength for the build materials and/or fusing agent that is delivered by the energy component, increase the number of times the energy component delivers energy of the appropriate wave length for the build materials and/or fusing agent and increase the amount of fusing agent deposited by the agent depositing component).

In other examples, a selected mode can indicate prioritizing the coloring properties of the print job. Additionally, the material properties of the build material utilized by the material depositing component can be such that the build material can lose some of its aesthetic properties the more energy from the energy component the more fused the build material becomes. Taken together, control logic 102 can relax the acceptable range of tolerances with respect to the strength properties specified by the print job (e.g., decrease the amount of energy of an appropriate wavelength for the build materials and/or fusing agent that is delivered by the energy component, decrease the number of times the energy component delivers energy of the appropriate wavelength for the build materials and/or fusing agent and decrease the amount of fusing agent deposited by the agent depositing component) and restrict the acceptable range of tolerances with respect to the coloring properties of the print job (e.g., increase the amount of energy of an appropriate wavelength for the coloring agents that is delivered by the energy component, increase the number of times the energy component delivers the energy with the appropriate wave length for the coloring agent and increase the amount of coloring agent deposited by the agent depositing component).

The three-dimensional printer control system 100 (e.g., control logic 102) can receive input from a user making a mode selection through any one of multiple possible interfaces. For example, a user can enter input directly into the printer system using a user interface feature (e.g., touchscreen, etc.) of the printer. Alternatively, the mode selection may be made by the user interacting with the printer system over a network, or through an intermediary network service. In other examples, data indicating a specific mode control logic 102 is to operate in (e.g., mode data) can be included in the print job. In such examples, the print job can be submitted wirelessly (e.g., using WiFi, BlueTooth, BLE (Bluetooth low energy), NFC, or other appropriate short-range communication) through a service application running on a mobile device or directly uploaded (e.g., SD card, flash drive, or other appropriate mobile storage device) to a three-dimensional printer system.

Three-dimensional printer control system 100 can include a database to store data relating to the different types of modes control logic 102 can operate in. For example, the database can store multiple predetermined modes and each mode can define an acceptable range of tolerances with respect to physical properties of an output. Additionally, in some implementations, the database can include data relating to build materials that can be utilized by the material depositing component and their corresponding material properties. In some examples, the material properties of the build material can limit the availability of a mode that control logic 102 can operate in. For example, the optical characteristics of a build material (e.g., an example build material can turn black after absorbing any amount of energy from energy component 104) can restrict or make unavailable a mode that prioritizes color properties of the build material. Data indicating the availability of modes for each build material, based on the material properties of each build material can be stored in the database.

Figure 2:
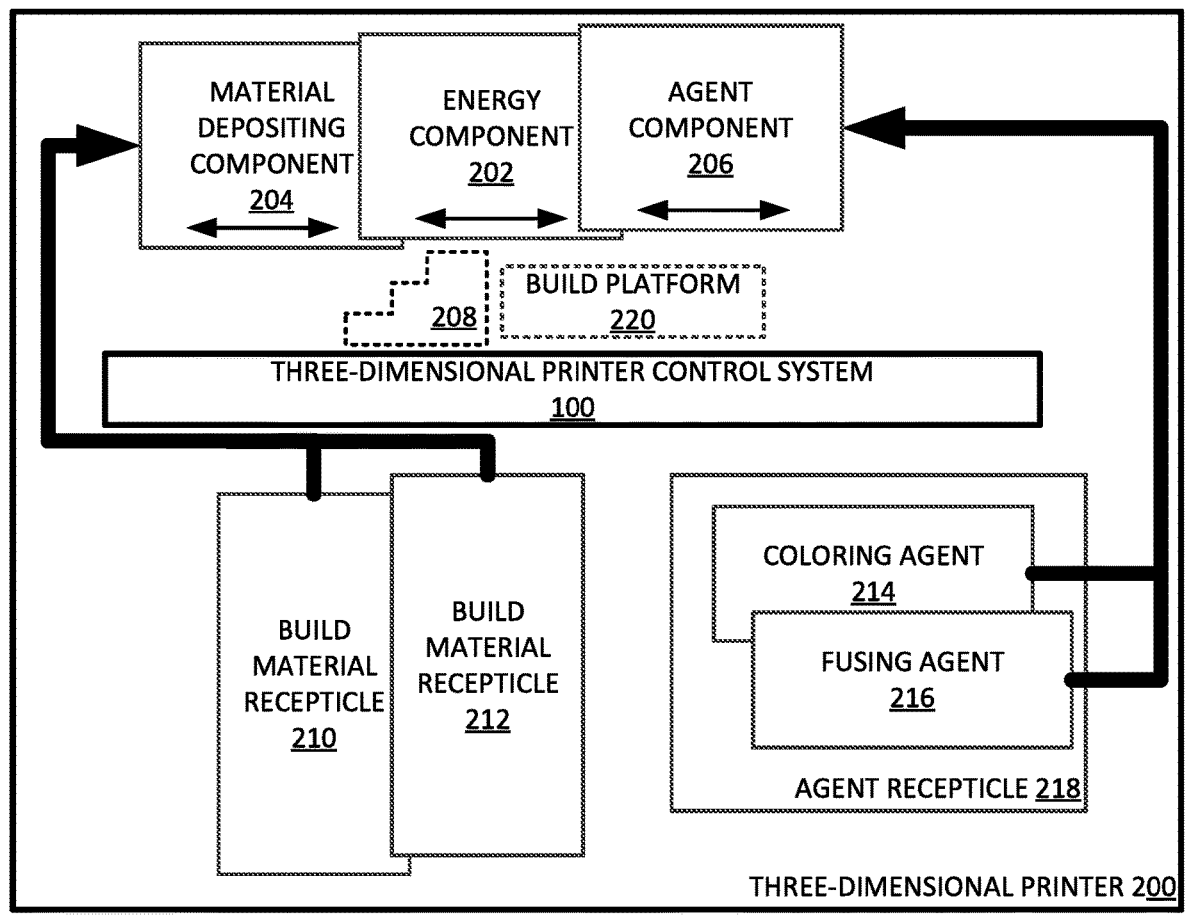
FIG. 2 illustrates an example three-dimensional printer that can be modulated in operation.

FIG. 2 illustrates an example three-dimensional printer that can be modulated in operation. As illustrated by FIG. 2, three-dimensional printer 200 can include energy component 202, material depositing component 204, agent depositing component 206 and three-dimensional control system 100 (herein referred to as control system 100). Control system 100 can implement processes and other logic to manage operations of the three-dimensional printer 200 to generate output 208. For example, control system 100 can control the operation of energy component 202, material depositing component 204, and agent depositing component 206 to form output 208. In some examples, control system 100 can operate in multiple modes. Each mode can define a set of tolerances for an output of three-dimensional printer 200 (e.g., dimensional tolerances, tolerances of strength or material properties, and tolerances of aesthetics (e.g., vibrancy of color)). Additionally, control system 100 can determine a set of operational parameters for three-dimensional printer 200 (e.g., energy component 202, material depositing component 204, and/or agent depositing component 206) to form an output abiding by the set of tolerances.

A selected mode can cause control system 100 to control/modulate the operational parameters of the internal components of three-dimensional printer 200 (e.g., energy component 202, material depositing component 204 and/or agent depositing component 206). Additionally, control system 100 can control/modulate the internal components of three-dimensional printer 200 by multiple interfaces (e.g., an energy component interface, a material depositing component interface and/or an agent depositing component interface). Examples of operational parameters of three-dimensional printer 200 control system 100 can modulate, based on a selected mode can include, the amount of energy delivered by energy component 202, when the energy is delivered by energy component 202, the speed at which energy component 202 passes and delivers energy to the build materials, the location of where the energy component 202 directs the energy, the amount at which material depositing component 204 lays the build materials, the speed at which the material depositing component 204 lays the build materials, location at which material depositing component 204 lays the build material, the amount at which agent depositing component 206 lays the agents, the speed at which agent depositing component 206 lays the agents, location at which agent depositing component 206 lays the agents, and the order at which material depositing component 204 and agent depositing component 20G lay down build material and agents and energy component 202 delivers energy.

In some implementations, based on a selected mode, control system 100 can control and/or modulate an ordered layering process (e.g., three-dimensional printer 200 forms output 208 by successively depositing and fusing layers of build material and agents) to form the output. For example, control system 100 can control the order that material depositing component 204 and agent depositing component 206 lay down build material and agents (e.g., coloring agent and/or fusing agent). Additionally, control system 100 can control the timing and order that energy component 202 exposes energy to the build material and/or agent.

Still further, Control system 100 can operate in any one of multiple possible modes. In some examples, each mode can indicate an acceptable range of tolerances with respect to the physical properties of the output specified by the print job that control system 100 can adhere to when forming the output. In other examples, each mode can indicate a physical property (e.g., the aesthetics of the output, the strength of the output and the dimensional accuracy of the output object) that control system 100 can prioritize when forming the output.

In some examples, some modes can cause control system 100 to relax the acceptable range of tolerances (e.g., a proof mode) with respect to the physical properties of the output specified by the print job. In such examples, a selected mode indicating a relaxed range of tolerances can cause control system 100 to determine a set of operational parameters for three-dimensional printer 200 (e.g., energy component 202, material depositing component 204 and/or agent depositing component 206) to form an output that has physical properties within the relaxed range of tolerances.

Additionally, in some examples, control system 100 can modulate the operational parameters initially determined for the print job (e.g., to form an output with physical properties specified by the print job) to the operational parameters that would form the output with physical properties within the relaxed range of tolerances. In such examples, the selected mode could result in a faster overall formation of the output of the print job by three-dimensional printer 200. Examples of operational parameters of three-dimensional printer 200 control system 100 can modulate to form an output with physical properties within the relaxed range of tolerances include decreasing the amount of energy delivered by energy component 202, decreasing the number of times energy component 202 delivers energy to the build material and/or agent, decreasing the amount of build material deposited by material depositing component 204, Increasing the rate that build material is deposited by material depositing component 204, decreasing the amount of agent deposited by agent depositing component 206, and increasing the rate that agent depositing component 206 deposits the agent.

In some examples, a selected mode indicating a relaxed range of tolerances could result in an output with physical properties (e.g., aesthetics, elongation, tensile strength, impact strength, dimensional accuracy, etc.) that are different from the physical properties specified by the print job.

For example, the object could be materially weaker than the strength properties specified by the print job, the aesthetics of the output could differ (e.g., a less vibrant coloring) than the aesthetics properties specified by the print job, and/or the dimensions of the output could be less accurate than the dimensional properties specified by the print job.

In other examples, some modes can cause control system 100 to restrict the acceptable range of tolerances (e.g., a final mode) with respect to the physical properties of the output specified by the print job. In such examples, a selected mode with a restricted range of tolerances can cause control system 100 to determine a set of operational parameters for three-dimensional printer 200 (e.g., energy component 202, material depositing component 204 and/or agent depositing component 206) to form an output that has physical properties closely matched to the physical properties specified by the print job.

Additionally, in some examples, control system 100 can modulate the operational parameters initially determined for the print job (e.g., to form an output with physical properties specified by the print job) to the operational parameters that would form the output with physical properties within the restricted range of tolerances. In such examples, the overall formation of the output of the print job by three-dimensional printer 200 could be slower. Examples of operational parameters of three-dimensional printer 200 control system 100 can modulate the operational parameters by increasing the amount of energy delivered by energy component 202, increasing the number of times energy component 202 delivers energy to the build material and/or agent, increasing the amount of build material deposited by material depositing component 204, decreasing the rate that material depositing component 204 deposits the build materials, increasing the amount of agent deposited by agent depositing component 206, and decreasing the rate that agent depositing component 206 deposits the agents.

In some examples, a selected mode indicating a relaxed range of tolerances could result in an output with physical properties (e.g., the physical properties of the output (e.g., aesthetics, elongation, tensile strength, impact strength, dimensional accuracy, etc.) that more closely match the physical properties specified by the print job.

In yet other examples some modes can cause control system 100 to prioritize a physical property of the output (e.g., aesthetics, elongation, tensile strength, impact strength, dimensional accuracy, etc.). In such examples, control system 100 can determine a set of operational parameters for three-dimensional printer 200 (e.g., energy component 202, material depositing component 204 and/or agent depositing component 206) to prioritize the physical property indicated by the selected mode. Additionally, control system 100 could modulate the operational parameters of three-dimensional printer 200 from the operational parameters determined for the print job (e.g., to form an output with physical properties specified by the print job) to the operational parameters that would form the output object with the prioritized a physical property associated with the selected mode. In some examples, a mode can indicate multiple physical properties to prioritize in the formation of the output.

In some examples, a selected mode can prioritize the aesthetics (e.g., color, texture, etc.) of an output of a print job. For example, a selected mode can indicate prioritizing the color property of the output. In response, control system 100 could determine the operational parameters for three-dimensional printer 200 (e.g., energy component 202, material depositing component 204 and/or agent depositing component 206) that prioritizes the color property of output (as indicated by the selected mode). In some examples, control system 100 can modulate the operational parameters determined for the print job (e.g., to form an output with physical properties specified by the print job) to the operational parameters that would prioritize the physical property associated with the selected mode when forming the output. Examples of operational parameters of three-dimensional printer 200 (e.g., energy component 202, material depositing component 204 and/or agent depositing component 206) control system 100 could modulate to prioritize color can include, the amount of coloring agent deposited by agent depositing component 206, the amount of fusing agent deposited by agent depositing component 206, the amount of energy delivered by energy component 202 to the build material and/or agent (e.g., coloring agent and/or fusing agent) and the order that material depositing component 204 and agent depositing component 206 deposit build material and agent.

Control system 100 can consider the material properties of the build material being utilized by material depositing component 204 when determining or modulating a set of operational parameters for three-dimensional printer 200 (e.g., energy component 202, material depositing component 204 and/or agent depositing component 206 to form an output of the print job). For example, a build material deposited by material depositing component 204 can lose some of its aesthetic properties the more fused the build material is. Additionally, a selected mode indicates prioritizing the strength properties (e.g., tensile strength or impact strength) of the output of the print job. Taken together, control system 100 can modulate the operational parameters of three-dimensional printer 200 by taking into consideration the selected mode and the material properties of the build material when forming the output. For example, control system 100 can relax the acceptable range of tolerances with respect to the coloring properties specified by the print job (e.g., decrease the amount of energy of an appropriate wavelength for the coloring agent that is delivered by energy component 202, decrease the number of times energy component 202 delivers said energy of the appropriate wavelength for the coloring agent and decrease the amount of coloring agent deposited by agent depositing component 206) and make more restricted the acceptable range of tolerances with respect to the strength properties (e.g., increase the amount of energy of an appropriate wavelength for the build materials and/or fusing agent that is delivered by energy component 202, increase the number of times energy component 202 delivers energy of the appropriate wavelength for the build materials and/or fusing agent and increase the amount of fusing agent deposited by agent depositing component 206

In other examples, a selected mode can indicate prioritizing the coloring properties of the print job. Additionally, the material properties of the build material utilized by material depositing component 204 can be such that the build material can lose some of its aesthetic properties the more energy from energy component 202 the more fused the build material becomes. Taken together, control system 100 can relax the acceptable range of tolerances with respect to the strength properties specified by the print job (e.g., decrease the amount of energy of an appropriate wavelength for the build materials and/or fusing agent that is delivered by energy component 202, decrease the number of times energy component 202 delivers energy of the appropriate wavelength for the build materials and/or fusing agent and decrease the amount of fusing agent deposited by agent depositing component 206) and restrict the acceptable range of tolerances with respect to the coloring properties of the print job (e.g., increase the amount of energy of an appropriate wavelength for the coloring agents that is delivered by energy component 202, increase the number of times energy component 204 delivers the energy with the appropriate wave length for the coloring agent and increase the amount of coloring agent deposited by agent depositing component 206).

In some examples, as illustrated in FIG. 2, three-dimensional printer 200 can include build platform 220. In such examples, a selected mode can cause control system 100 to modulate operational parameter of material depositing component 204 related to depositing height of material depositing component 204 (e.g., the distance between material depositing component 204 and the previously formed layer of the output on build platform 220 or build platform 220). The greater the distance between material depositing component 204 to the previously fused layer of the output or build platform 220, the more build material can be deposited by material depositing component 204. As such, the mode can affect the thickness of each build material layer when forming output 208. Additionally, in such examples, the mode may indicate a range of tolerances with respect to the thickness of each build material layer when forming output 208 and whether to restrict or relax those ranges. Control system 100 can map the appropriate operational parameters for material depositing component 204 to the indicated restricted or relaxed range of tolerances for the thickness.

In some examples, three-dimensional printer 200 can include build material receptacle(s) (e.g., build material receptacle 210 and build material receptacle 212) to store fresh build material or recycled build material. Additionally, material depositing component 204 can utilize and deposit the build material (fresh build material and/or recycled build material) stored in build material receptacle 210 and/or build material receptacle 212 when forming output 208 of a print job. As illustrated in FIG. 2, three-dimensional printer 200 can include build material receptacle(s) (e.g., build material receptacle 210 and build material receptacle 212). Fresh build material is build material that has not yet been exposed to energy from the energy component 202. Recycled build material is build material that has been exposed to energy from energy component 202, but not enough energy to fully fuse the build material to form output 208. In some examples, build material receptacle 210 and/or build material receptacle 212 can contain fresh build material. In other examples, build material receptacle 210 or build material receptacle 212 can contain recycled build material.

Additionally, in some examples, a selected mode can indicate the usage of recycled build material, fresh build material or a mixture of fresh and recycled build material. Additionally, in such examples, the selection of said mode can modulate the operational parameters initially determined from the print job to the operational parameters indicated by the mode. For example, control system 100 can determine from the print job to utilize fresh build material. However, selection of a mode that indicates usage of recycled build material can cause control system 100 to change material depositing component 204 operational parameters to the usage of recycled build material.

In some examples, three-dimensional printer 200 can include agent receptacle(s) 218 (e.g., coloring agent receptacle 214 and fusing agent receptacle 216) to store various coloring agent or fusing agent. Additionally, control system 100 can determine a set of operational parameters for agent depositing component 206 related to usage of coloring agent from coloring agent receptacle 214 and/or fusing agent receptacle 216 based on a selected mode and/or print job.

The three-dimensional printer control system 100 (e.g., control logic 102) can receive input from a user making a mode selection through any one of multiple possible interfaces. For example, a user can enter input directly into the printer system using a user interface feature (e.g., touchscreen, etc.) of the printer. Alternatively, the mode selection may be made by the user interacting with the printer system over a network, or through an intermediary network service. In other examples, data indicating a specific mode control system 100 is to operate in (e.g., mode data) can be included in the print job. In such examples, the print job can be submitted wirelessly (e.g., WiFi, BlueTooth, BLE (Bluetooth low energy), NFC, or other appropriate short-range communication) through a service application running on a mobile device or directly uploaded (e.g., SD card, flash drive, or other appropriate mobile storage device) to the three-dimensional printer 200 (e.g., received by control system 100).

Control system 100 can include a database to store data relating to the different types of modes control system 100 can operate in. For example, the database can store multiple predetermined modes and each mode can define an acceptable range of tolerances with respect to physical properties of an output. Additionally, in some implementations, the database can include data relating to build materials that can be utilized by material depositing component 204 and their corresponding material properties. In other examples, the material properties of the build material can limit the availability of a mode that control system 100 can operate in. For example, the optical characteristics of an example build material (e.g., the example build material can turn black after absorbing any amount of energy from energy component 202) can restrict or make unavailable a mode that prioritizes color properties of the build material. Data indicating the availability of modes for each build material, based on the material properties of each build material can be stored in the database.

Methodology

Figure 3:
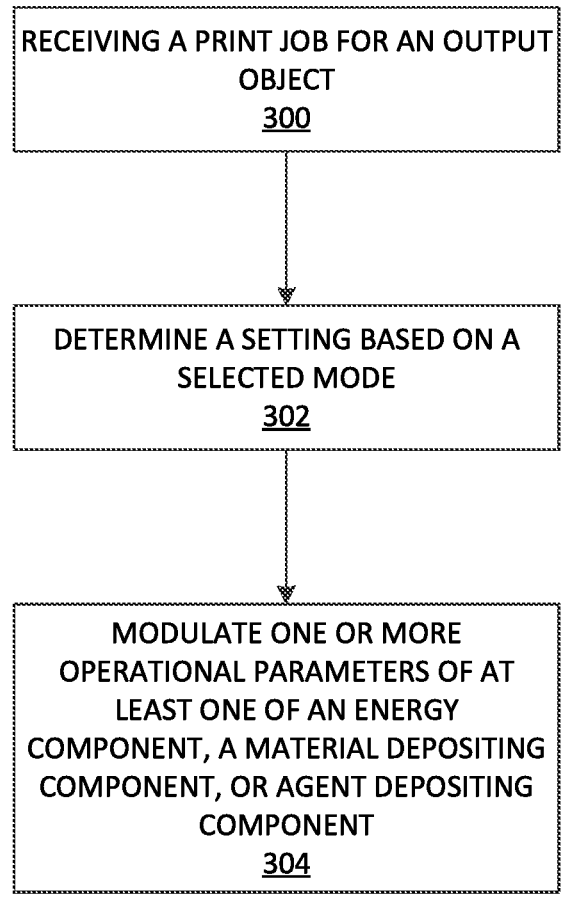
FIG. 3 illustrates an example method for modulating an operational parameter of a three-dimensional printer.

FIG. 3 illustrates an example method for modulating a physical property of the output. The below discussion of FIG. 3 may be made to reference characters representing like features as shown and described with respect to FIG. 1 for purposes of illustrating a suitable component for performing the example method being described.

In some examples, three-dimensional printer control system 100 (herein referred to as control system 100) can receive a print job for an output (300). For example, control logic 102 can receive a print job from a mobile computing device. The print job may specify a physical property (e.g., strength, cosmetics, dimensions, etc.) or multiple physical properties of an output. Control logic 102 can determine a set of operational parameters for a three-dimensional printer system to generate an output with the physical property specified in the print job. In some examples, control system 100 can receive from mobile computing device of a user a print job wirelessly (e.g., WiFi, Bluetooth, BLE (Bluetooth low energy), NFC, or other appropriate short-range communication). In other examples, the print job may directly upload (e.g., SD card, flash drive, or other appropriate mobile storage device) to control system 100.

Control system 100 can also determine a setting based on a selected mode (302). In some examples, each mode can cause control system 100 to modulate the operational parameters of a three-dimensional printer system (e.g., an energy component, a material depositing component and/or an agent depositing component) determined from the print job. In some examples, each mode can correspond to an acceptable range of tolerances with respect to the physical properties specified by the print job control system 100 can adhere to when forming the output of the print job. In other examples, each mode can indicate a physical property of the output (e.g., the aesthetics, the strength and/or the dimensional accuracy of the output) for control system 100 to prioritize.

Examples of operational parameters control logic can control/modulate of the three-dimensional printer system (e.g., an energy component, a build material depositing component and/or an agent depositing component), include, the amount of energy delivered by the energy component, when the energy is delivered by the energy component, the number of times the energy component delivers energy to the build materials, the location of where the energy component directs the energy, the amount at which the material depositing component lays the build materials, the speed at which the material depositing component lays the build materials, location at which the material depositing component lays the build material, the distance between material depositing component and the previously formed layer of the output (or build platform), the amount at which the agent depositing component lays the agents, the speed at which the agent depositing component lays the agents, location at which the agent depositing component lays the agents, and the order at which the material depositing component and the agent depositing component lay down build material and agents and the energy component delivers energy.

In some examples, some modes can cause control system 100 to relax the acceptable range of tolerances (e.g., a proof mode) with respect to the physical properties specified by the print job. In such examples, a selected mode associated with a relaxed range of tolerances can cause control system 100 to determine a set of operational parameters for a three-dimensional printer system (e.g., an energy component, a material depositing component and/or an agent depositing component) to form an output that has physical properties within the relaxed range of tolerances.

In other examples, some modes can cause control system 100 to restrict the acceptable range of tolerances (e.g., a final mode) with respect to the physical properties specified by the print job. In such example, a selected mode associated with a restricted range of tolerances can cause control system 100 to determine a set of operational for a three-dimensional printer system (e.g., an energy component, a material depositing component and/or an agent depositing component) to form an output that has physical properties more closely matched to the physical properties specified by the print job.

In yet other examples, some modes can indicate a physical property of the output for control system 100 to prioritize when forming the output. For example, a selected mode can cause control system 100 to modulate the operational parameters of a three-dimensional printer system (e.g., an energy component, a material depositing component and/or an agent depositing component) to prioritize a physical property (e.g., the aesthetics of the output, the strength of the output and the dimensional accuracy of the output) when forming the output.

Control system 100 (e.g., control logic 102) can receive input from a user making a mode selection through any one of multiple possible interfaces. For example, a user can enter input directly into the printer system using a user interface feature (e.g., touchscreen, etc.) of the printer. Alternatively, the mode selection may be made by the user interacting with the printer system over a network, or through an intermediary network service. In other examples, data indicating a specific mode control logic 102 is to operate in (e.g., mode data) can be included in the print job. In such examples, the print job can be submitted wirelessly (e.g., using WIFI, BlueTooth, BLE (Bluetooth low energy), NFC, or other appropriate short-range communication) through a service application running on a mobile device or directly uploaded (e.g., SD card, flash drive, or other appropriate mobile storage device) to a three-dimensional printer system.

Control system 100 can modulate operational parameters of at least one of an energy component, a material depositing component, and/or an agent depositing component from the operational parameters associated with the print job to the operational parameters based on the selected mode (304). As discussed previously, in some examples, the selected mode can correspond to an acceptable range of tolerances with respect to the physical properties specified by the print job. In other examples, the selected mode can indicate a physical property or multiple physical properties of the output to prioritize. As such, control system 100 can modify a physical property or multiple physical properties of the output specified by the print job, based on the modulated operational parameters. For example, control system 100 can modulate operational parameters of three-dimensional printer system (e.g., an energy component, a material depositing component, and/or an agent depositing component) to form an output with physical properties that are based on the modulated operational parameters.

Although specific examples have been illustrated and described herein, it will be appreciated by those of ordinary skill in the art that a variety of alternate and/or equivalent implementations may be substituted for the specific examples shown and described without departing from the scope of the disclosure. This application Is Intended to cover any adaptations or variations of the specific examples discussed herein.

What is claimed is:

1. A control system for a three-dimensional printer, the control system comprising:
    an energy component interface;
    an agent depositing component interface;
    control logic to:
        control, in forming an output object that is specified in a print job, an energy component using the energy component interface and an agent depositing component using the agent depositing component interface; and
        wherein the control logic controls the energy component and the agent depositing component to implement any one of a plurality of modes for the three-dimensional printer, in which each mode, when selected, causes the control logic to modulate one or more operational parameters of at least one of the energy component or agent depositing component based on a set of tolerances specific to a respective mode that vary from a tolerance indicated by the print job.

2. The control system of claim 1, wherein the control logic is further to:
    alter the implementation of the selected mode based on a parameter of the print job.

3. The control system of claim 2, wherein the parameter of the print job includes a build material type.

4. The control system of claim 1, wherein the control logic is further to:

trigger providing a user interface to enable a user to select any one of the plurality of modes.

5. The control system for the three-dimensional printer of claim 1, the control system further comprising:
a material depositing component interface, wherein the control logic is further to control, in forming the output object that is specified in the print job, a material depositing component using the material depositing component interface based on the set of tolerances of the selected mode.

6. The control system of claim 5, wherein the control logic modulates the operational parameters for at least one of the energy component, material depositing component or agent depositing component to a preset range that prioritizes a cosmetic parameter of the print job, based on selection of a mode corresponding to prioritizing the cosmetic parameter of the print job.

7. The control system of claim 5, wherein the control logic modulates a preset range of operational parameters for at least one of the energy component, material depositing component or agent depositing component to a preset range that prioritizes a layering speed of the material depositing component, based on selection of a mode corresponding to prioritizing the layering speed.

8. The control system of claim 1, further comprising a database to:
store a set of tolerances and a corresponding plurality of settings for each of the plurality of modes, wherein the control logic modulates one or more operational parameters of each of the energy component, the material deposit component and the agent depositing component based on the settings associated with the selected mode.

9. The control system of claim 1, further comprising a mode of the plurality of modes that relaxes a tolerance indicated by the print job so as to prioritize dimensional accuracy in the output object.

10. The control system of claim 1, further comprising a mode of the plurality of modes that relaxes a tolerance indicated by the print job so as to prioritize tensile strength in the output object.

11. The control system of claim 1, further comprising a mode of the plurality of modes that relaxes a tolerance indicated by the print job so as to prioritize vibrancy of color in the output object.

12. The control system of claim 1, further comprising a proof mode of the plurality of modes that relaxes the tolerances indicated by the print job so as to result in a faster overall formation of the output object.

13. The control system of claim 1, wherein a mode of the plurality of modes overrides a specification in the print job for fresh build material to utilize recycled build material.

14. The control system of claim 1, wherein a mode of the plurality of modes restricts a range of tolerance for a material strength property of the output object and relaxes a range of tolerance for an aesthetic property of the output object.

15. The control system of claim 1, wherein material properties of a build material specified to be used limit availability of one of the modes of the plurality of modes from being selected.

16. A control system for a three-dimensional printer, the control system comprising:
an energy component interface;
an agent depositing component interface;
control logic to:
control, in forming an output object that is specified in a print job, an energy component using the energy component interface and an agent depositing component using the agent depositing component interface;
wherein the control logic controls the energy component and the agent depositing component to implement anyone of a plurality of modes for the three-dimensional printer, in which each mode, when selected, causes the control logic to modulate one or more operational parameters of at least one of the energy component or agent depositing component; and
wherein the control logic modulates operational parameters for at least one of the energy component, material depositing component or agent depositing component to a preset range that equally prioritizes a dimensional accuracy parameter, a strength parameter and a cosmetic parameter of the print job, based at least in part on a first mode of the plurality of modes being selected.

17. A method for operating a three-dimensional printer system, comprising:
receiving a print job for an output object;
receiving selection of one of a plurality of modes, each mode comprising a set of tolerances at least one of which varies from a corresponding default tolerance or tolerance specified in the print job;
determining a setting of a plurality of settings, based on a selected mode of a plurality of modes; and
modulating one or more operational parameters of at least one of an energy component, a material depositing component, or agent depositing component, based on the determined setting so as to prioritize one property of the output object over another, different property of the output object based on the selected mode.

18. The method of claim 17, wherein modulating the one or more operational parameters is further based on a parameter of the print job.

19. The method of claim 18, wherein the parameter of the print job includes a build material type.

20. The method of claim 17, wherein modulating the one or more operational parameters comprises modulating operational parameters for at least one of the energy component, material depositing component or agent depositing component to a preset range that equally prioritizes a dimensional accuracy parameter, a strength parameter and a cosmetic parameter of the print job, based at least in part on the selected mode.

* * * * *